United States Patent
King

[15] 3,643,603
[45] Feb. 22, 1972

[54] SPACER AND COUPLING DEVICE FOR CARGO PALLETS

[72] Inventor: Eddie L. King, 228 South 16th Street, Richmond, Calif. 94804

[22] Filed: Dec. 29, 1969

[21] Appl. No.: 888,464

[52] U.S. Cl. ................................. 105/366, 213/75
[51] Int. Cl. ........................... B61g 5/00, B65j 1/24
[58] Field of Search .......... 105/366; 213/75, 86, 98, 188; 24/211, 81; 248/119; 244/118, 137

[56] References Cited

UNITED STATES PATENTS

| | | | |
|---|---|---|---|
| 2,191,222 | 2/1940 | Sheehan | 105/366 R |
| 3,093,092 | 6/1963 | Martin et al. | 105/366 R |
| 3,251,489 | 5/1966 | Davidson | 244/137 X |
| 3,359,605 | 12/1967 | Hulverson et al. | 105/366 R |
| 3,429,536 | 2/1969 | Petry et al. | 105/369 A X |
| 3,449,801 | 6/1969 | Lafont et al. | 105/366 R |
| 3,456,967 | 7/1969 | Tantlinger et al. | 105/366 R |

*Primary Examiner*—Drayton E. Hoffman
*Attorney*—Joseph B. Gardner

[57] ABSTRACT

A coupling device for releasably interconnecting two successively adjacent cargo pallets to form a train thereof as when loading, unloading or while aboard a cargo aircraft or other transport therefor. Such pallets are relatively large and carry loads of several tons, and they are bordered with a perimetric frame having spaced-apart flanges therealong alternating with tiedown rings pivotally secured to the frame. The coupling device has a plate adapted to overlie the pallet flanges, and it also has a T-shaped spacer cooperative with the flanges and spaces therebetween to position two successive pallets in a predetermined spaced orientation. Posts carried by the coupling device receive tie rings from the successive pallets, and releasable lock means confines the rings in position upon the posts.

6 Claims, 17 Drawing Figures

INVENTOR
EDDIE L. KING
ATTORNEY

INVENTOR
EDDIE L. KING
BY: Joseph B. Sackler
ATTORNEY

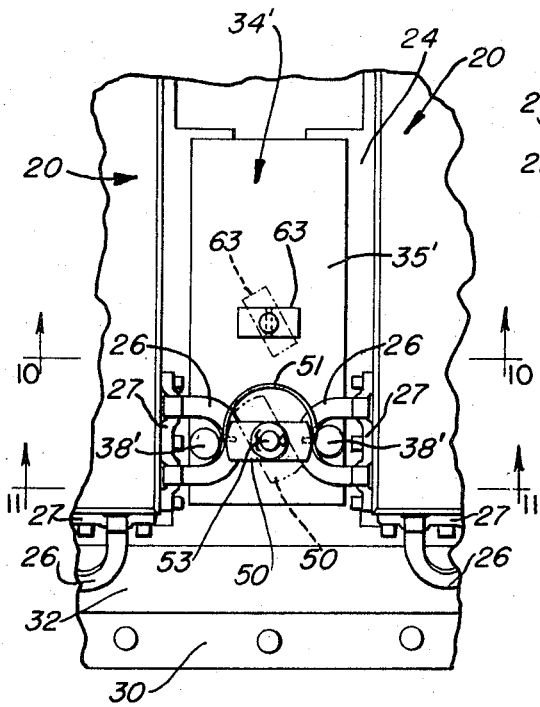
Fig. 9
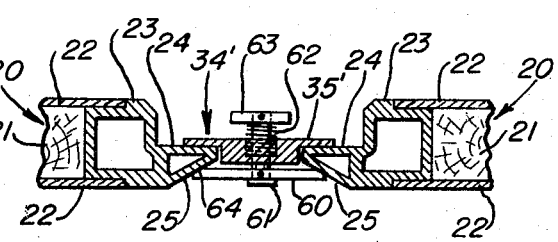
Fig. 10
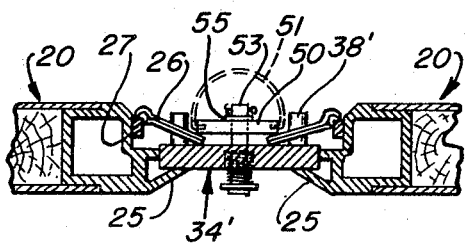
Fig. 11
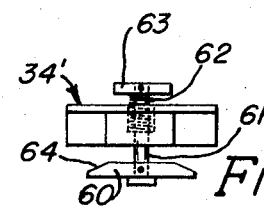
Fig. 16
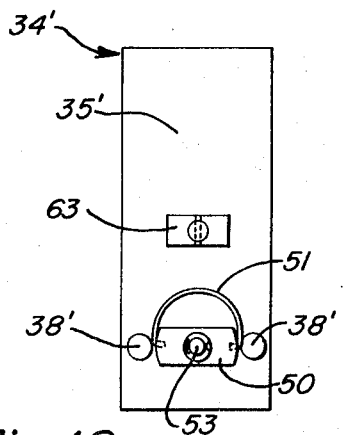
Fig. 12   Fig. 13   Fig. 14
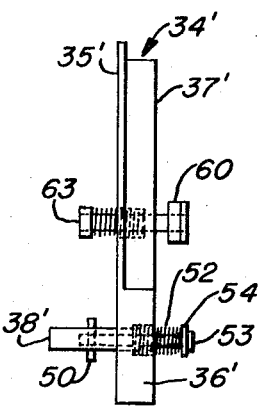
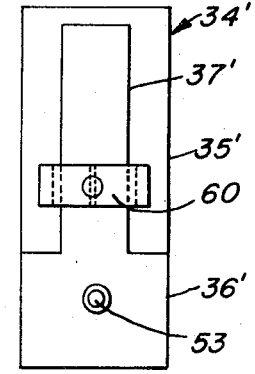
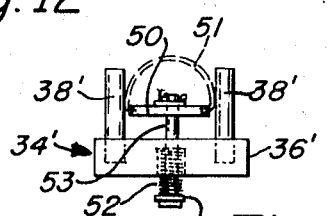
Fig. 15
INVENTOR
EDDIE L. KING
BY: Joseph B. Gardner
ATTORNEY

SPACER AND COUPLING DEVICE FOR CARGO PALLETS

This invention relates generally to palletized shipment of cargo in cargo aircraft and other transports, and it relates more particularly to a coupling device for releasably interconnecting successively adjacent cargo pallets to form a train thereof.

Cargo pallets of the type particularly considered herein are used in various environments, and the shipment of military cargo in aircraft intended therefor is a typifying instance. Such pallets are individually heavy, and when loaded may weigh in the neighborhood of four tons each. It is customary to construct these pallets of a core faced with sheet metal and encompassed around the edges by a heavy perimetric metal frame member. It is customary to form both the side and end frame members with a horizontal flange which is subdivided into spaced apart sections each having about one half the thickness of the pallet. These flanges are utilized to hold the pallet on the floor of the plane by passing them under a confining rail. Such pallets have a number of tie rings spaced apart along the frame which are used to lash cargo to the pallet and to tie the pallet to a support surface therefor. The projecting flanges also serve to space successive pallets one from another.

The coupling device for the present invention comprises a plate on the lower face of which is a spacer of T-shaped form providing a stem or longitudinally extending ridge adapted to be abutted by and hold the projecting flanges of successive pallets the proper distance apart. A pair of posts extending upwardly from the plate are adapted to be engaged by the tie rings of successive pallets, and a locking bar forming a part of releasable locking means holds the rings in engagement with the posts. In one form of the invention, a second locking bar forming a part of releasable clamping means is located along the bottom of the coupling device and is operative to engage the lower edges of the projecting flanges on the pallets and thereby lock the coupling device thereon.

It is a primary object of the present invention to provide a highly efficient coupling device for interconnecting cargo or transportation pallets of the style customarily used in shipping palletized cargo, as in aircraft configurated for this purpose.

It is another object of the present invention to provide a coupling device of the character described which is light in weight, convenient to use and requires no tools to interconnect or disconnect pallets, and which is rugged but readily repairable should it ever be required.

These and other objects and advantages of the present invention will be readily apparent from the following description taken in conjunction with the accompanying drawings in which:

FIG. 9 is a broken top plan view of a modified embodiment of the coupling device showing it in the position in which it interconnects two successively adjacent pallets;

FIG. 10 is a longitudinal sectional view of the modified coupling device taken along the line 10—10 of FIG. 9;

FIG. 11 is another longitudinal sectional view of the modified device taken along the line 11—11 of FIG. 9;

FIG. 12 is a top plan view of the device shown in FIGS. 9, 10 and 11;

FIG. 13 is a side view in elevation of the device shown in FIG. 12;

FIG. 14 is a bottom plan view of the modified device;

FIG. 15 is an end view in elevation from one end showing further details of the locking means;

FIG. 16 is an end view in elevation taken from the opposite end of the device to show the clamping means.

Figure 1:
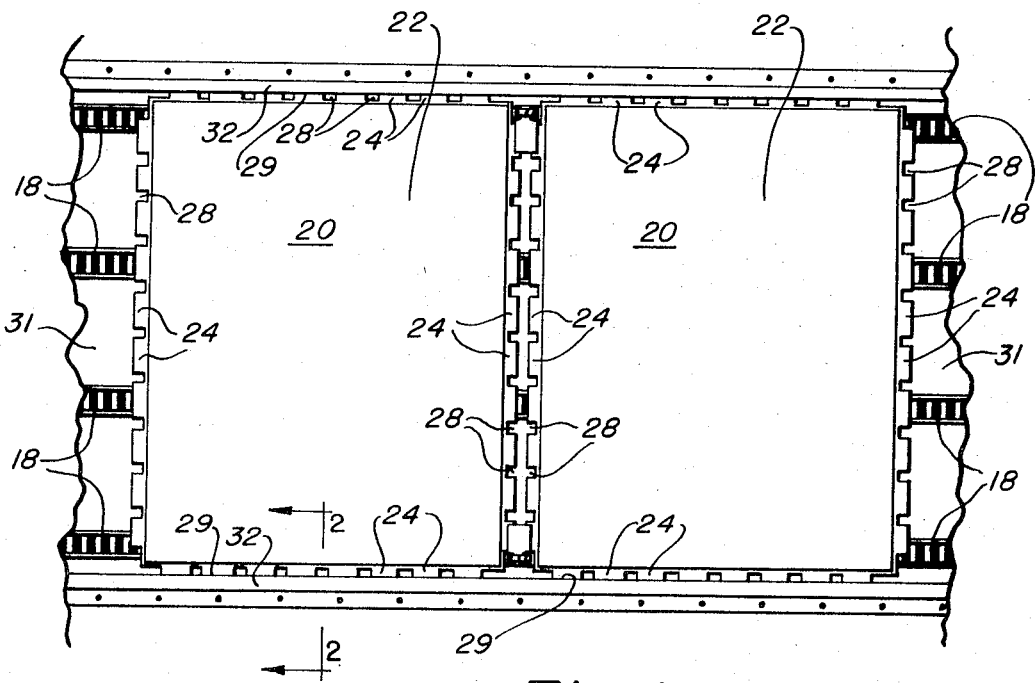
FIG. 1 is a broken top plan view of a pair of pallets interconnected by couplers embodying the invention, the pallets being supported along the floor of a cargo aircraft.
Figure 2:
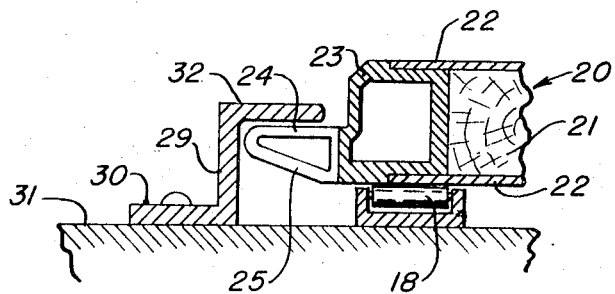
FIG. 2 is a broken transverse sectional view, on an enlarged scale, of one of the pallets shown in FIG. 1, the view being taken along a plane indicated by the line 2—2 of FIG. 1.

Transport or cargo pallets are commonly used in the shipment of freight which is tied or otherwise secured thereon to enable the load-carrying pallet to be bodily onloaded and offloaded from the shipping vehicle such as a cargo plane or a truck. These pallets are frequently used when speed of loading and unloading is a very important factor and hence, are advantageously used in shipping military cargo especially in Air Force cargo planes. The pallets which are used for handling such freight are typically about seven feet long and 9 feet wide, the long dimension being usually oriented along the width of the vehicle or plane in which they are shipped and the shorter dimension then being oriented along the length thereof. In cargo planes, it is usual to provide a plurality of longitudinally extending, transversely spaced, roller-equipped tracks 18, as shown in FIGS. 1 and 2 extending from an access opening in one end thereof. Such pallets, generally denoted with the numeral 20, with their loads thereon are placed upon the track 18 and are readily moved therealong upon the rollers to the desired position.

The transport pallets 20 are of heavy construction normally weighing about 300 pounds when unloaded and often weighing in the neighborhood of four tons when loaded. The pallets 20 may be constructed of a wooden core 21, the bottom and top of which are faced with metal sheets 22. The edges of the pallet are formed of heavy metal frame members 23, usually a boxlike extrusion. The frame members 23 carry a plurality of spaced apart projecting flanges 24 each having a flat upper surface located at about the midpoint or center plane of the pallet and also having a lower sloping cam face 25. These projections or flanges 24 are normally hollow as shown in order to save weight, and they may be formed integrally with the frame members 23 but also can be formed separately and rigidly fixed thereto as by bolting or welding.

The frame members 23 of the pallets 20 each carry a plurality of spaced apart tie rings 26 (best shown in FIGS. 3 and 4) which are generally U-shaped members hingedly mounted along the ends and sides of each pallet. These rings 26 are usually hinged as by looping the ends thereof over a hinge bar 27 welded or otherwise fixedly secured to the frame members 23 in general alignment with the spaces 28 defined between adjacent flanges 24. The rings are used in locking cargo to the pallet and in anchoring the pallet in position along a support therefor, and as respects the present invention, they are used in association with the coupling devices to interconnect successively adjacent pallets, as will be explained hereinafter.

In loading cargo-equipped pallets onto a cargo plane or other vehicle having tracks 28, each pallet may be lifted by a fork lift truck or other loading mechanism and aligned on the tracks between the constraining devices 29 which are double L-shaped channels having a vertical web and oppositely projecting horizontal flanges including a lower flange 30 bolted to the floor 31 of the aircraft and an upper flange 32 which overlies the top face of the spacers 24, as shown best in FIG. 2. Thus, the constraining devices 29 prevent transverse and vertical (i.e., upward) displacements of the pallets, and anchor devices, not shown, are used to prevent longitudinal displacements of the pallets. Since cargo pallets and track-support arrangements therefor are conventional and well known, no further description thereof is believed necessary.

The first embodiment of the coupling device to be considered herein is denoted in its entirety with the numeral 34 and will be described with particular reference to FIGS. 3 to 8, inclusive. It comprises a flat plate 35 of rectangular form and on the bottom of which is a T-shaped spacer that includes an end block 36 adapted to substantially fill the spaces 28 at the corners of a pallet 20 bordering the outermost spacer flanges 24, as shown best in FIGS. 3 and 4. The spacer also includes a centered abutment stem or longitudinal ridge 37 adapted to be abutted by the outer edges of the spacing projections or flanges 24 of successive pallets 20 (see FIG. 4). As best shown in FIG. 4, the upper plate 36 rests upon, spans and partially overlies the flat upper edges of the spacing flange 24, the end member 36 of the T-shaped spacer abutting the terminal edges of the flanges 24 to locate the coupler and constrain it against inward transverse displacement along the pallet. The plate 35 carries a pair of sturdy pins or posts 38 rigidly secured thereto, as by welding, which are adapted to be engaged by the tie rings 26, as shown in FIG. 3.

The coupling device is provided with locking means operative to confine the rings 26 upon the posts 38, and such means includes a locking bar 39 which is rotatably mounted upon a pivot pin or bolt 40 (see FIG. 5 to 8) that can be screwed into a threaded aperture through the plate 35 and end member 36. The locking bar 39 being loosely mounted on the bolt 40, can be rotated as well as axially shifted therealong. The bar 39 is provided with a pair of apertures adapted to closely fit over the posts 38 so as to constrain the bar against rotation. Thus, when the bar is in the locking position shown in FIGS. 3 and 5 the tie rings 26 cannot accidentally be displaced from engagement thereof with the posts 36. A helical compression spring 46, the lower end of which is seated against the locking bar 39 and the upper end against a washer 42 held at the end of the bolt 40 by any suitable means, such as a cotter pin as shown, is circumjacent the bolt 40 and biases the bar downwardly toward the plate 35.

Figure 3:
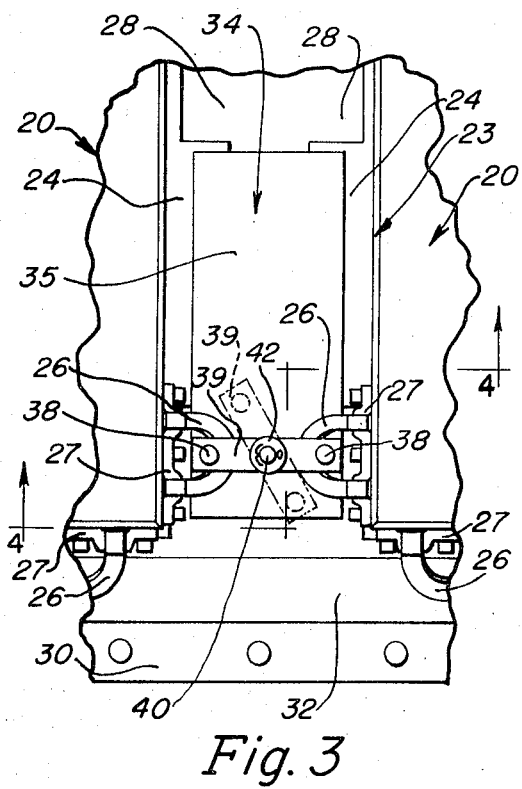
FIG. 3 is a broken top plan view, on an enlarged scale, of one of the coupling devices showing it in the position in which it interconnects two successively adjacent pallets.
Figure 4:
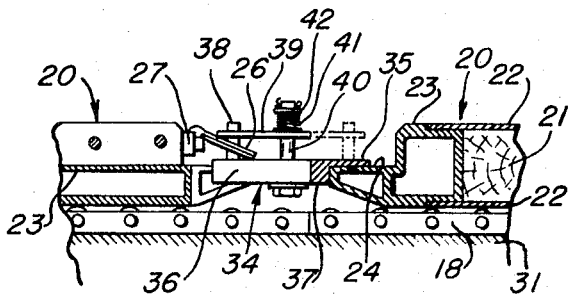
FIG. 4 is a longitudinal sectional view taken along the line 4—4 of FIG. 3.

The device 34 is used to lock two successively adjacent pallets together to form a train by placing a device between the adjacent corners of successive pallets, as shown in FIGS. 1 and 3, with the facing flanges 24 in abutment with the restricted stem 37 of the T-shaped spacer and the end member 36 in engagement with the terminal edges of such flanges. The locking bar is rotated into the release position thereof shown in FIG. 3, and the tie rings 26 are dropped over the pins 38, the locking bar 39 returned to the full line lock position shown by lifting it so as to clear the posts 38, displacing it angularly to align the openings thereof with the posts, and then releasing the bar to permit it to move downwardly over the posts and against the rings 26.

The pallets can be readily uncoupled by lifting the locking bar 39 against the force of spring 41, rotating the bar into the dotted line release position shown in FIG. 3, lifting the tie rings 26 from the posts 38, and releasing the locking bar. However, accidental displacement of the locking bar, and consequently of the tie rings 26 from their engagement with the pin 38, is virtually impossible.

The second or modified embodiment of the coupling device is shown in FIGS. 9 to 16, inclusive, and is generally denoted 34'. In this embodiment, the top plate 35', the end member 36', the bottom ridge 37', and the locking posts 38' are essentially the same as in the first form shown in FIGS. 3 to 8. The modified device differs from the first embodiment in that the locking means are changed somewhat so as to terminate below the pins 38, as best shown in FIGS. 11 and 12, and essentially lie within the vertical dimensions of the pallets 20. In this respect, the locking bar 50 which is equipped with a bail 51 for manipulation thereof is biased downwardly toward the plate 35' by a spring 52 circumjacent a bolt 53 and seated at its upper end in a pocket or recess drilled in the end member 36, the lower end of the spring being seated against a washer 54 held in the proper location at the lower end of the bolt 53 by any suitable means, such as the enlarged head of the bolt.

The locking bar 50 can be rotatably or rigidly mounted on the pivot pin or bolt 53 as desired, it being immaterial whether the bolt 53 turns in the plate 35' and/or whether the bar turns on the bolt. However, since the bolt 53 must be inserted through an opening in the plate 35' sufficiently large to permit easy axial displacement of the bolt, it is also usually rotatable. The locking bar 50 is confined upon the bolt 53 by a washer 55 and cotter pin, as in the embodiment of FIGS. 3 through 5, and the rockable bail 51 normally lies against the top of the face plate 35 but can be rocked or swung upwardly into the broken line position shown in FIGS. 11 and 15 to enable a workman to readily lift the locking bar 50 and bolt 53 against the force of spring 52 and rotate the bar between the lock and release positions thereof respectively shown in full lines and broken lines in FIG. 9. In its lock position, the bar 50 overlies and engages the upper faces of the tie rings 26 and thereby prevents their accidental disengagement from the pins 38'. As shown in FIG. 11, in its normal locking position, the locking bar 50 and the pivot 53 by means of which it is pivotally mounted, lie above the lower faces of the pallets 20 and below the upper faces thereof, as do all other components of the coupler device.

In this embodiment, clamping means are included for fixedly constraining the device 34' on the pallets 20, and such means comprises a lower locking bar 60 located at about the midpoint of the plate 35'. This locking bar 60 is rigidly mounted on the lower end of the pivot pin 61 extending through an opening in the plate 35' and longitudinal ridge 37'. The outer end of the locking bar is beveled, as shown at 64 in FIG. 16, so that it may firmly abut the lower slopping faces 25 of the spacing projections 24 affixed to the pallet 20 (see FIG. 10). The pin 61 and lower locking bar 60 may be rotated by a short handle or control bar 63 rigidly secured to the upper end of the pivot pin 61 so that manual rotation of the handle 63 rotates the locking bar 60 by the same amount. A relatively strong compression spring 62 is seated between the lower face of the handle 63 and the upper face of a pocket or recess formed in the plate 35, and biases the bar 60 upwardly toward the stem 37' of the spacer.

The handle 63 is displaced into the dotted line position shown in FIG. 9 to enable the coupling device 34' to be dropped between the flanges 24, of successively adjacent pallets 20 as a first step in interconnecting the same. The handle 63 is then depressed to displace the locking bar 60 downwardly, whereupon the locking bar can be rotated to the full line position shown in FIG. 9 to clamp the device 34' to the flanges 24, as shown in FIG. 10. When the handle 63 is released, the spring 62 forces the locking bar 60 upwardly against the lower faces 25 of the adjacent flanges 24, thereby locking the coupling device against accidental displacement both upwardly and downwardly since the plate 35' overlies the flanges 24.

It will be apparent from the foregoing disclosure and drawings that a train of interconnected pallets can be formed by first placing one pallet 20 upon the rails 18 and moving it forwardly until a second pallet has room to be placed upon the rails in following succession. Since the pallets are supported upon the track rollers, proper spacing between successive pallets is readily obtained to permit the coupler device 34' (or 34) to be dropped between two successive pallets with the plate 35' overlying the upper flat edges of the adjacent spacing projections 24 of the pallets with the longitudinal ridge 27' disposed between the two facing adjacent projections 24, and with the end member 36' located within the spaces 24 at the ends of adjacent projections.

The locking bars 39 or 50, as the case may be, are rotated to the dotted line release position shown in FIGS. 3 or 9 so that the tie rings 26 on the two successively adjacent pallets can be dropped over the respective posts 38, and the locking bar then returned to the full line lock position shown in these figures. As heretofore explained, such movement is accommodated since the bars can be lifted against the biasing force of their respective springs and then rotated, and when released by the operator, the force of the springs urges the locking bars tightly against the tie rings 26. In the form shown in the second embodiment of FIGS. 9 through 16, the lower locking member 60 of the latch means is also rotated into the locking position shown in FIG. 10 and the handle released so that the force of the spring urges the lower locking member upwardly against the lower face of the spacing projections 24 on the pallet 20.

Figure 17:
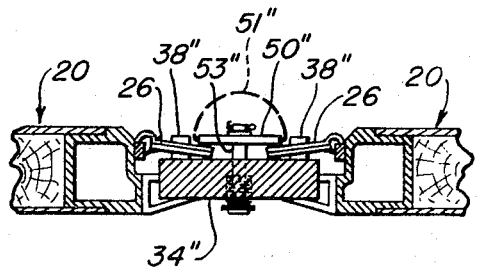
FIG. 17 is a longitudinal sectional view of a further modified device, the view corresponding generally to those of FIGS. 4 and 11.
Figure 5:
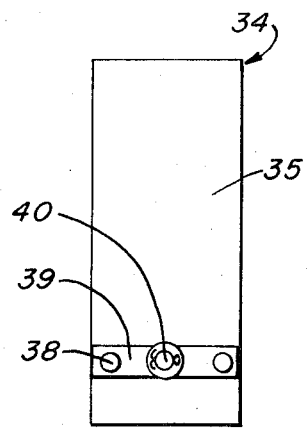
FIG. 5 is a top plan view of the coupler device shown in FIGS. 3 and 4.
Figure 6:
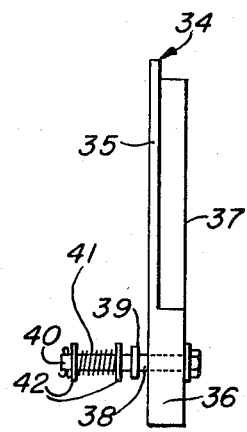
FIG. 6 is a side view in elevation of the coupling device shown in FIG. 5.
Figure 7:
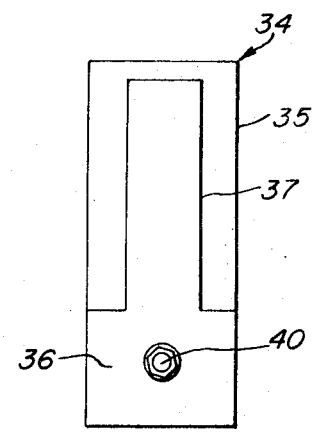
FIG. 7 is a bottom plan view of the coupling device.
Figure 8:
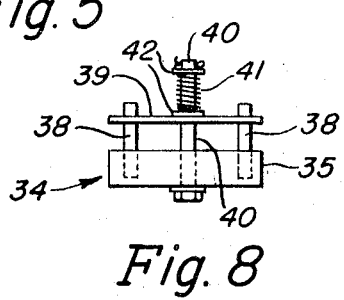
FIG. 8 is an end view in elevation of the coupling device.

The modified embodiment of the invention illustrated in FIG. 17 is essentially the same as the coupling device 34' heretofore described except that the latching means comprising the lower locking bar 60, handle 63, and components associated therewith have been omitted. Further, the dimensions of the coupling device have been changed somewhat in a vertical direction so that the rings 26 have a generally horizontal orientation when secured to the upright posts as shown in FIG. 17. With the somewhat more angular disposition of the rings 26 as shown in both FIGS. 4 and 11, it has been found that there is a tendency for such rings to attempt to assume a generally horizontal disposition when a pulling force is applied between two pallets 20 in a generally longitudinal direction or across the the coupling device from one posts thereof to another. Since the rings 26 bind upon the posts when such force is applied, the coupling device is lifted slightly from the pallet flanges 24 unless latching means of the type shown in FIG. 10 is used to constrain the coupling device against vertical displacement. In view of the essential similarities between the embodiments of the device shown in FIG. 17 and in FIGS. 9 through 15, the double primed form of the same numerals have been used to identify the respectively corresponding components of the coupling device 34" illustrated in FIG. 17.

Increasing the vertical thickness of the device 34" also increases the strength thereof which is sometimes desirable when an angular force is imparted to the device which can occur, for example, when one pallet 20 assumes a vertically offset orientation relative to the pallet to which it is connected through such coupling device. A vertical displacement of this type may occur when the pallets are being loaded onto an aircraft, especially by inexperienced machine operators, since each successive pallet loaded onto the aircraft is quite heavy and tends to displace the same relative to the next successive pallet which, then, has a much higher elevation than the prior-loaded pallet to which it is connected. By way of example so as to provide an order-of-magnitude indication of the size of a typical coupling device, the length thereof in its greatest dimension may be from 8 to 10 inches, the thickness of the plate 35 may be from about 3/16 to ½ inch, and the thickness of the T-shaped spacer underlying the plate 35 may be from about ½ to ¾ of an inch. The width of the stem 37 of such T-shaped spacer may be about 2 inches, and the width of the plate 35 should be somewhat wider than the stem so as to overlie the flanges 24 as shown in FIGS. 4 and 10, and the position of the posts 38 is such that the rings 26 can be placed thereover when a pair of successively adjacent pallets 20 are interconnected by the coupling device.

It should be observed that there is no need to lift either of the pallets in either interconnecting or disconnecting the same, and either procedure can be accomplished in a very short time—usually in but a very few seconds. Ordinarily, two coupling devices interposed between successive pallets at the adjacent corners thereof are sufficient to effect adequate coupling or interconnection. However, more couplers may be used if desired, and in certain cases a single, centrally located coupler could be adequate. A continuous train of any length can be made, and in most instances it will be desirable to load and unload a relatively long train of interconnected pallets (perhaps eighteen, for example) onto and off of the carrier such as from special platforms or ramps provided for this purpose.

The coupling device lies essentially within the vertical dimensions of the pallets 20, and entirely therewithin in the embodiments of FIGS. 9 through 16 and 17, and is thereby protected by the pallets themselves against damage from the cargo or otherwise. The couplers are light in weight, require no tools to operate, and are readily repairable if damaged, but can be made as rugged as desirable out of various materials—high-strength aluminum being a specific example—including both metals and plastics.

It will be understood that the drawings and the above disclosure treat specifically with particular embodiments of my invention, and that many modification will occur to those skilled in the art which will not depart from the inventive concept herein disclosed. Accordingly, it is intended that the appended claims cover such modifications as fall within the true spirit and concepts of this invention.

What is claimed is:

1. A coupling device for interconnecting successive pallets each having a plurality of spaced apart projections along the sides thereof and tie rings at spaced intervals therealong, comprising a main body component for interposition between two such successive pallets and including a plate adapted to overlie portions of facing projections of two successive pallets and a spacer underlying said plate for abutment by projections of such successive pallets, connector structure releasably cooperable with tie rings of such successive pallets to couple the same one to another through said coupling device and including a plurality of binding posts secured to said main body and extending upwardly from said plate in spaced relation so as to be respectively engaged by such tie rings of two successive pallets to effect the aforesaid coupling thereof, and locking means selectively movable between lock and release positions to constrain said connector structure in cooperative interengagement with such tie rings and to enable release thereof and including locking plate structure supported by said coupling device for movement with respect to said posts between such lock and release positions so as to enable such tie rings to be dropped over said posts and to be removed therefrom in the release position of said locking means and to constrain the tie rings on said posts in the lock position, and means tending to maintain said locking plate structure in the lock position thereof.

2. The coupling device of claim 1 in which said spacer is generally T-shaped in plan view and includes a stem adapted to be positioned between facing projections of successive pallets and a base adapted to abut the ends of such projections.

3. The coupling device of claim 1 in which said locking plate structure comprises a plate pivotally supported intermediate said posts for movement between such lock and release positions and in the locked position thereof overlying any such tie ring in position about an associated post.

4. The coupling device of claim 3 in which said locking plate is bodily displaceable generally along the axes of said posts between elevated and depressed positions relative to said main body component, and in which the aforesaid means tending to maintain said locking plate in the lock position thereof includes spring means biasing the same toward such depressed position.

5. A coupling device for interconnecting successive pallets each having a plurality of spaced apart projections along the sides thereof and tie rings at spaced intervals therealong, comprising a main body component for interposition between two such successive pallets and including a plate adapted to overlie portions of facing projections of two successive pallets and a spacer underlying said plate for abutment by projections of such successive pallets, connector structure releasably cooperable with tie rings of such successive pallets to couple the same one to another through said coupling device, and locking means selectively movable between lock and release positions to constrain said connector structure in cooperative interengagement with such tie rings and to enable release thereof, said connector structure including a plurality of binding posts secured to said main body and extending upwardly therefrom in spaced relation so as to be respectively engaged by such tie rings of two successive pallets so as to effect the aforesaid coupling thereof, and said locking means being movable with respect to said posts so as to enable such tie rings to be dropped over said posts and to be removed therefrom in the release position of said locking means and to constrain the tie rings on said posts in the lock position, said locking means including a locking plate pivotally supported intermediate said posts for movement between the lock and release positions and also being displaceable generally along the axes of said posts between an elevated position spaced from said main body and a depressed position adjacent thereto, and said locking means further including spring means biasing said locking plate downwardly toward said main body so that said locking bar in the locked position thereof overlies any such tie rings in position about said posts.

6. The coupling device of claim 5 and further comprising fastener means carried by said body member and being selectively moveable between lock and release positions and adapted to underlie two such facing projections of successive pallets in the lock position to constrain said coupling device in position thereon.

* * * * *